Aug. 8, 1950     S. O. HUNTINGTON     2,518,142
TOOL FOR HANDLING SNAP RINGS
Filed Dec. 14, 1946
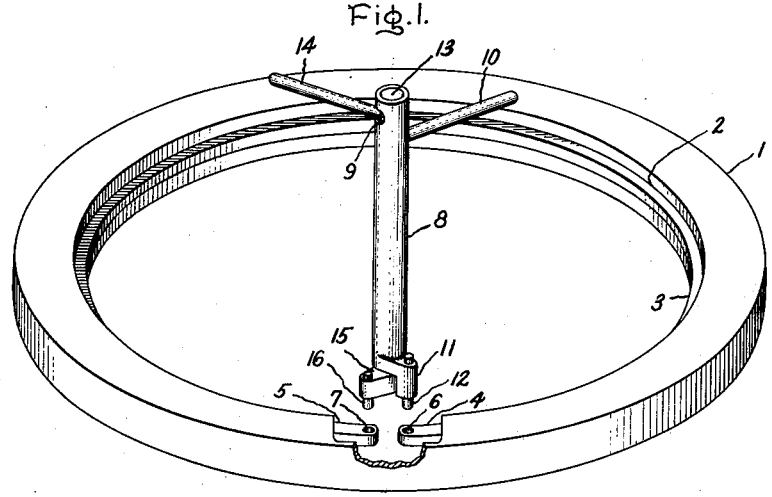
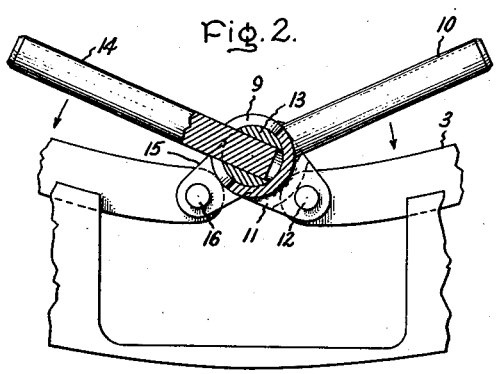
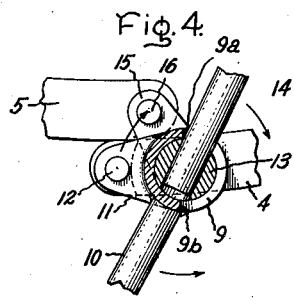
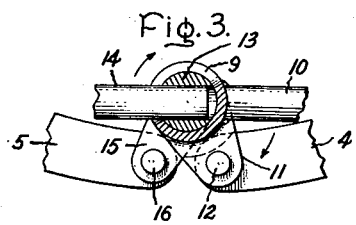
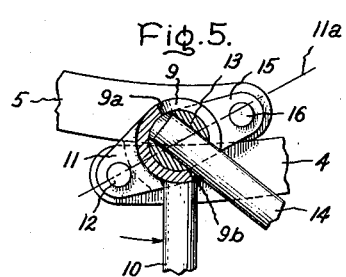
Inventor:
Sidney O. Huntington,
by *Prowell E. Mack*
His Attorney.

UNITED STATES PATENT OFFICE 2,518,142

TOOL FOR HANDLING SNAP RINGS

Sidney O. Huntington, Scotia, N. Y., assignor to General Electric Company, a corporation of New York Application December 14, 1946, Serial No. 716,330

1 Claim. (Cl. 29—229)

This invention relates to an improved tool and method for the assembly and disassembly of internal snap-rings. Split rings of this type may be used advantageously as retaining members for large ring gears in high speed gear reduction trains. However, heretofore these snap-rings have not been used extensively because of the mounting and removal difficulties encountered.

Internal snap-rings can be removed by means of a tool having two spaced pins in fixed relation to each other. These pins are adapted to be inserted in holes provided in the two ends of the split ring. Rotation of the tool causes one pin to describe an arc radially inwardly about the other pin as a center, bringing the two ends of the ring into overlapping relation. With the two ends overlapping in this manner, the ring is sufficiently contracted so that it can be withdrawn readily. However, this method and tool has proven unsatisfactory because, while rotating one end of the split ring radially inward about the other end as a center, a comparatively small end portion of the ring is subjected to most of the bending stress. This stress may exceed the elastic limit of the stressed end portion of the ring; and the result is a permanent set which renders the ring useless.

Since the tools heretofore employed to handle internal snap-rings had pins fixed relative to each other, separate tools were required for snap-rings of different sizes.

By contrast, a tool in accordance with my invention applies a contracting force to the ends of a split snap-ring in a manner such that the bending stress is distributed more or less uniformly throughout the entire ring when the ends are moved into overlapping relation. Furthermore, the tool is so constructed that it may be employed with rings of several different sizes.

An object of the invention is to provide improved means for inserting and removing internal snap-rings.

Another object is to provide an improved method and tool for handling internal snap-rings in a manner which avoids damage to the ring, so that it can be used repeatedly.

A further object is to provide an improved tool for assembling and disassembling internal snap-rings, which is effective for rings of different sizes.

Other objects and advantages will be apparent from the following description taken in connection with the accompanying drawing, in which Fig. 1 is a perspective view of a tool embodying the invention with a representative internal snap-ring assembly; and Figs. 2, 3, 4, 5, are top views partly in section of the tool and snap-ring assembly of Fig. 1, showing progressively the various relative positions of the tool and ring during removal of the ring.

Referring now to the drawing, a representative internal snap-ring assembly comprises an outer housing member 1 defining an annular retaining recess 2 formed on a radially inner surface of member 1. A split snap-ring 3 of conventional design has end portions 4, 5 and is arranged within recess 2 in such a way that the inner diameter of the ring, when assembled, is less than the inner diameter of member 1. To facilitate removal, holes 6, 7 are formed in the respective end portions of ring 3. It will be understood that the ring has considerable resilience, being forged or otherwise fabricated of a suitable spring steel, and has a "free" outer diameter equal to or somewhat greater than the diameter of the retaining recess 2.

The snap-ring tool in accordance with this invention may conveniently comprise an outer tubular member 8 having at one end a semi-circular slot 9. Secured to the upper end of tube 8 is a radially extending handle 10. At the other end is secured a radial arm 11 provided with an axially extending pin 12. Coaxially arranged within tube 8 is a shaft 13, to the upper end of which is secured a handle 14 extending outwardly through slot 9 in the outer tube 8. To the other end of shaft 13 is secured arm 15 having axial pin 16. The movement of handle 14 relative to handle 10 is limited by the circumferential extent of slot 9. Slot 9 also serves to keep shaft 13 axially located within tube 8, since handle 14 which is secured to shaft 13 extends outwardly through the slot.

To use the tool to remove the snap-ring, the handles are rotated relative to each other until pins 12, 16 are so spaced that they can be inserted in holes 6, 7, as shown in Fig. 2. Handles 10 and 14 are then turned clockwise and counter-clockwise respectively until the handles assume substantially diametrically opposite positions, as shown in Fig. 3. It will be apparent that this operation causes the pins 12, 16 to move towards each other in a circumferential direction with no radial component of motion, thus causing the ring to contract uniformly with no bending of the end portions. Handle 10 is now rotated farther, in a clockwise direction. The end wall 9a of slot 9 engages handle 14, as shown in Figs. 3 and 4, thereby causing handle 14 to likewise turn clockwise and pin 16 to rotate clockwise (from the position of Fig. 3) about pin 12 as a center. This brings the end portions 4, 5 of ring 3 into overlapping relation, as in Fig. 4. The dimensions of the tool are preferably so related to those of the ring that, while overlapping the end ring portions, a minimum bending stress is produced in ring 3 since the end and outer surface of portion 5 is closely adjacent or actually contacting the end and inner surface of portion 4. In other words, the portion 5 moves radially only a sufficient distance to bring the ends into overlapping relation as in Fig. 4.

Further contraction of the end portions to the minimum diameter position is caused by turning handle 14 in a clockwise direction. During this movement, handle 14 leaves end 9a of slot 9 and moves into engagement with the opposite end 9b. Meanwhile handle 10 moves slightly counterclockwise. By thus turning handle 14 clockwise, pin 16 is caused to rotate about the axis of the tool, thereby producing the further overlapping motion of ends 4, 5, as in Fig. 5. At the same time, handle 10 necessarily turns slightly counterclockwise, shifting the axis of the tool (the center of shaft 13) radially inwardly, that is, upwardly, as in Fig. 5, in order to maintain constant contact between the engaging surfaces of end portions 4, 5. This composite movement of handles 14 and 10 contracts ring 3 sufficiently so that it may be readily removed from housing 1.

It should be noted that the last movement of the tool (Fig. 5) places arms 11 and 15 in an "over-center" or "toggle" relation. That is, pin 16 moves clockwise to a position somewhat beyond the projected center-line 11a of arm 11, so that the resilient expansion force exerted by the snap-ring acts to bias the arms to the "closed" position, in which handle 14 engages the end 9b of slot 9 (Fig. 5). This obviates the necessity for the operator to continue to exert force on handles 10, 14 while removing the ring from the housing, the natural resiliency of the snap-ring acting on the tool to hold ring and tool in the minimum diameter condition.

It will be apparent that the tool is used in a similar manner to insert snap-rings of the type described.

A tool in accordance with the invention, while designed primarily for internal snap-rings, may also be used to assemble and disassemble external snap-rings.

It has been found that my improved tool, and the new method of operation it makes possible, permits easy assembly and disassembly, by one man, of large, stiff forged steel snap-rings, of the order of 15 inches in diameter, without stressing any portion of the ring beyond the elastic limit, whereby a ring can be used repeatedly without material deterioration.

While a particular embodiment of the invention has been illustrated and described, it will be obvious to those familiar with the art that various changes and modifications may be made without departing from the invention; and it is intended to cover in the appended claim all such changes and modifications as come within the true spirit and scope of the invention.

What I claim as new and desire to secure by Letters Patent of the United States, is:

A tool for handling a split resilient ring comprising a first tubular member having at one end thereof a first eccentrically disposed axially extending pin portion adapted to pivotally engage a recess in one end portion of a split ring, a second coaxial shaft member rotatably disposed within the first member and having an end portion projecting from the tubular member adjacent said first eccentric portion and including a second eccentrically disposed axially extending pin portion adapted to pivotally engage a recess in the other end of the split ring, whereby said pins may be moved in an arcuate path relative to each other about the common axis of said members, means for effecting relative movement of said coaxial members about their common axis comprising a first radially extending handle secured to the tubular member at a location remote from said eccentric portions, a second radial handle secured to the shaft adjacent said first handle, and stop means carried by the tubular member and cooperating with the second handle to limit said relative movement from a first position wherein the pins are adjacent each other to a second position wherein the pins are located slightly more than 180° apart in an over-center relation with respect to a plane through said common axis, whereby upon engagement of the pin portions with a resilient split ring and rotation of the members to said second over-center position, the elastic biasing force exerted by the split ring on the members retains them in said over-center position with the second handle biased into engagement with the stop means without exertion of further force by the operator.

SIDNEY O. HUNTINGTON.

REFERENCES CITED

The following references are of record in the file of this patent:

UNITED STATES PATENTS

| Number | Name | Date |
|---|---|---|
| 818,869 | Calvert | Apr. 24, 1906 |
| 1,736,959 | Gibbons | Nov. 26, 1929 |
| 1,991,723 | Betz | Feb. 19, 1935 |
| 2,441,846 | Schaaff et al. | May 18, 1948 |